(No Model.)

H. STRATER.
BREWING VAT.

No. 513,215. Patented Jan. 23, 1894.

Witnesses.
E. K. Boynton
Francis C. Stanwood

Inventor.
Herman Strater.
by H. E. Lodge Atty.

THE NATIONAL LITHOGRAPHING COMPANY,
WASHINGTON, D. C.

UNITED STATES PATENT OFFICE.

HERMAN STRATER, OF BOSTON, MASSACHUSETTS.

BREWING-VAT.

SPECIFICATION forming part of Letters Patent No. 513,215, dated January 23, 1894.

Application filed October 6, 1892. Serial No. 448,008. (No model.)

*To all whom it may concern:*

Be it known that I, HERMAN STRATER, a citizen of the United States, residing at Boston, in the county of Suffolk and State of Massachusetts, have invented certain new and useful Improvements in Brewing-Vats; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to improvements in the construction of brewing-vats, or other receptacles provided with a false bottom perforated for draining purposes.

The object of my invention is to prevent the stopping up of the holes by the settling of the foreign matter contained in the liquid in process of draining, which now occurs to such a degree that little or no liquid, after a short time, percolates through, and the process is rendered slow and tedious.

Figure 1:
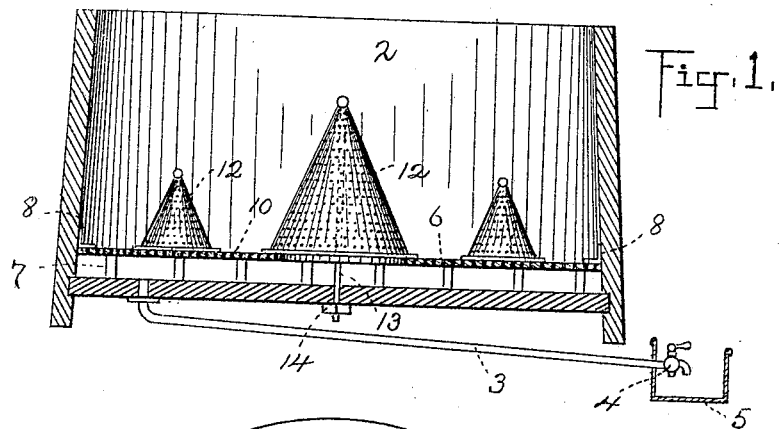
Figure 2:
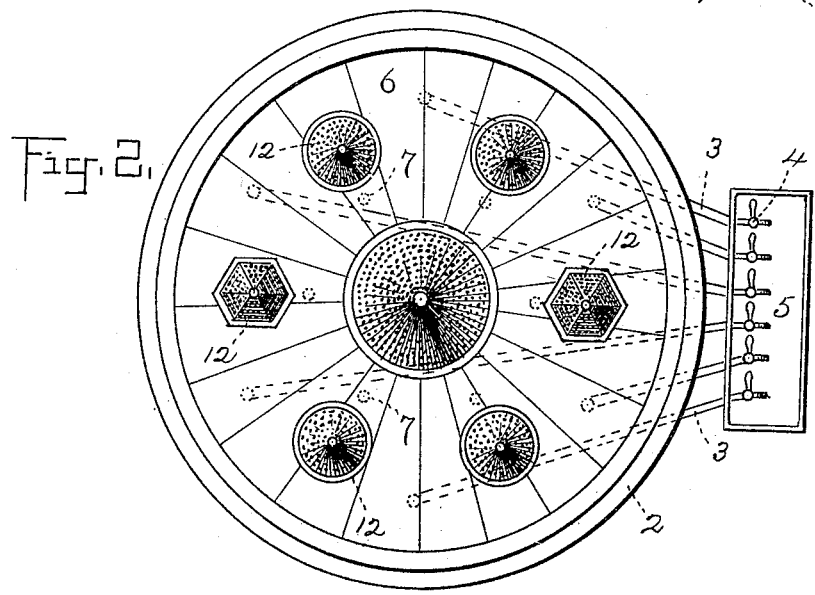
Figure 3:
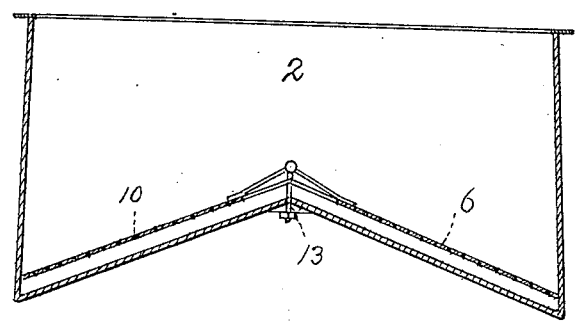

The drawings accompanying this specification represent in Figure 1 a plan, and Fig. 2 is a vertical section of a vat embodying my invention. Fig. 3 is a modified form of the same.

In brewing vats, particularly "hop-jacks," so called, or such as are employed to drain the beer from the hop leaves, or in mash tubs great difficulty has heretofore prevailed in the process of draining off the liquid owing to the "setting," so termed, of the foreign material contained in said liquid, said matter gradually dropping and collecting upon the bottom, until the flow of liquid from the vat is almost completely stopped. In many instances an upward flow of liquid or under flow, as it is styled, is occasioned at times to disturb such material and thus allow further escape of liquid before "setting" again takes place.

The object of my invention is to obviate the above-mentioned difficulty.

The general construction of a brewing vat is as follows: a circular water-tight vessel 2 of any desired dimensions, open at the top is provided with a series of drainage pipes 3, 3 each furnished with a valve 4 and all arranged to deliver into a common discharge duct 5. Vats of this class, whether hop-jacks or mash-tubs are generally provided with a false bottom 6 perforated to act as a filter or drainer. This false bottom is supported upon short posts 7 to enable it to uphold the weight of the contents when the vat is full, and is held in place by a number of angle-irons 8 affixed to the walls of the vat, while a central bolt, hereinafter mentioned prevents any tendency of the false bottom to buckle and holds it flat.

As before premised, immediately upon filling of the vat for the purpose of draining off the beer, or other liquid from the foreign matter not required, the material usually held in suspension commences to gravitate toward the bottom, such tendency being accelerated by the escape of the liquid through the orifices 10 contained in the false bottom. As the accumulation increases the suction does likewise, with the result that "setting" occurs: in other words the material packs down so tightly that but little liquid escapes. In this way unless artificial means, as an underflow, are adopted to lift and stir up the mass, the process is very slow, and consequently expensive. The less liquid there is in the vat, the more frequently must the mass be stirred to prevent entire stoppage in the percolation of the liquid. To obviate this difficulty I propose to place upon the false bottom of the vat a number of perforated prominences 12 in the shape of cones, pyramids or other similarly shaped bodies with outwardly sloping or inclined sides, in order to prevent the accumulation of material thereupon. These bodies are preferably hollow, and communicate with the bottom of the vat, the center one being preferably the largest with a central bolt 13, which passes through it downwardly and is secured by a nut 14. In this way the false bottom is held securely in place. The other prominences may be placed loosely upon the bottom and arranged in any manner to give the best results. In Fig. 3 I have shown a modification, where in lieu of the individual bodies I make the bottom with a retreating angle, so that the false bottom is of a conical shape, with the result that the foreign material, as it settles, slides from the center outwardly and so is constantly being moved, thereby uncovering some of the numerous small holes with the result that the liquid is enabled to flow through more freely. Hence it is evident that upon filling of the vat and the consequent discharge of liquid through the false bottom attended with the gradual subsidence of the matter held in suspension toward the bottom, and its final deposition upon said bottom, that said material is given an oblique direction as the liquid gradually escapes; in this way such particles are constantly being moved across the numerous orifices and the latter can not become obstructed, as when the material is permitted to descend vertically and become packed together. It is further evident that the material as it slides down along the sides of the prominences is being crowded together into a smaller space, and such act causes the particles to move transversely across each other in various directions within the vat, this motion being attended by constant opening and closing of the orifices.

What I claim is—

1. A vat or water-tight receptacle provided with a foraminous false bottom, and furnished with prominences having sides which flare downwardly, the said prominences being likewise perforated, substantially as and for purposes explained.

2. In combination with a vat or water-tight receptacle, and a perforated false bottom secured a short distance above the bottom proper, a group of hollow foraminated prominences having outwardly sloping sides adapted to pass liquid to the bottom of the tank, together with means for drafting the perfolated liquid out of the vat, substantially as and for purposes set forth and stated.

In testimony whereof I affix my signature in presence of two witnesses.

HERMAN STRATER.

Witnesses:
  H. E. LODGE,
  FRANCIS C. STANWOOD.